US006973671B1

(12) United States Patent
Hsing et al.

(10) Patent No.: US 6,973,671 B1
(45) Date of Patent: Dec. 6, 2005

(54) SECURE ACCESS TO A UNIFIED LOGON-ENABLED DATA STORE

(75) Inventors: Chi-Pei Michael Hsing, San Jose, CA (US); Alan Tsu-I Yaung, San Jose, CA (US)

(73) Assignee: International Business Machines Corporation, Armonk ny ( * ) Notice: Subject to any disclaimer, the term of this patent is extended or adjusted under 35 U.S.C. 154(b) by 0 days.

(21) Appl. No.: 09/513,065

(22) Filed: Feb. 24, 2000

(51) Int. Cl.[7] .......................... H04L 9/00; G06F 17/40
(52) U.S. Cl. ............................. 726/8; 713/202; 707/9; 707/10
(58) Field of Search ............................. 713/202, 182; 707/10, 9; 726/8

(56) References Cited

U.S. PATENT DOCUMENTS

| | | | |
|---|---|---|---|
| 5,241,594 A * | 8/1993 | Kung | 713/151 |
| 5,604,490 A * | 2/1997 | Blakley et al. | 713/200 |
| 5,689,638 A * | 11/1997 | Sadovsky | 713/202 |
| 5,774,551 A * | 6/1998 | Wu et al. | 713/155 |
| 5,815,574 A * | 9/1998 | Fortinsky | 713/153 |
| 5,881,234 A | 3/1999 | Schwob | |
| 5,953,504 A * | 9/1999 | Sokal et al. | 709/227 |
| 6,178,511 B1 * | 1/2001 | Cohen et al. | 713/201 |
| 6,233,618 B1 * | 5/2001 | Shannon | 709/229 |
| 6,243,816 B1 * | 6/2001 | Fang et al. | 713/202 |
| 6,311,275 B1 * | 10/2001 | Jin et al. | 713/201 |
| 6,359,711 B1 * | 3/2002 | Cole et al. | 398/58 |
| 6,463,474 B1 * | 10/2002 | Fuh et al. | 709/225 |
| 6,615,264 B1 * | 9/2003 | Stoltz et al. | 709/227 |

FOREIGN PATENT DOCUMENTS

| | | |
|---|---|---|
| GB | 2 343 531 A | 5/2000 |
| GB | 2 354 617 A | 3/2001 |

OTHER PUBLICATIONS

Stallings, William; Cryptography and Network Security; Jun. 4, 1998; Prentice-Hall, Inc., 2nd Edition; pp. 323-353.*
Lai et al.; "User Authentication and Authorization in the JAVA™ Platform"; Proceedings of the 15th Annual Computer Security Applications Conference, Dec. 1999, pp. 1-10.*
Bryant, Bill; "Designing an Authentication System: a Dialogue in Four Scenes"; MIT; 1998; pp. 1-16.*
Steiner et al.; "Kerberos: An Authentication Service for Open Network Systems"; MIT; Mar. 30, 1988; pp. 1-29.*
Kohl et al.; "The Evolution of the Kerberos Authentication Service"; MIT; Jun. 17, 1992; pp. 1-27.*
Samar et al.; "Making Login Services Independent of Authentication Technologies"; Sun Microsystems, Inc.; pp. 1-18.*
Schneier, Bruce; Applied Cryptography; 1996; John Wiley & Sons, Inc.; Chapter 3 and 12.*

(Continued)

Primary Examiner—Gilberto Barron, Jr.
Assistant Examiner—Jung Kim
(74) Attorney, Agent, or Firm—Sughrue Mion, PLLC

(57) ABSTRACT

A secure access system provides security for a computer connected to a data store. Initially, an authentication key, a user name, and a computer identifier are received. The authentication key is parsed to obtain a parsed user name and computer identifier. The parsed user name and computer identifier are validated using the received user name and computer identifier. Additionally, if the received user name and computer identifier are validated, the authentication key is parsed to obtain a server user identifier and a server password. Then, the parsed server user identifier and server password are used to connect to a database server computer.

43 Claims, 4 Drawing Sheets

OTHER PUBLICATIONS

VeriSign; "Certification Practice Statement"; May 30, 1997; VeriSign, Inc.*

Lisa Wirthman "Unifying Heterogeneous Computing Environments," PC Week, vol. 14, No. 31, Jul. 21, 1997, pp. 1-4.

V. Samar, "Unified Login With Pluggable Authentication Modules (PAM), " 3rd ACM Conference on Computer and Communications Security, New Delhi, India, Mar. 14-16, Sponsored by: ACM.

* cited by examiner

| Field | 1 | 2 | 3 | 4 | 5 | 6 | 7 | 8 | 9 |
|---|---|---|---|---|---|---|---|---|---|
| | the fourth string of the IP address | server user ID | separator ';' | the third string of the IP address | server password | separator ';' | the second string of the IP address | client user name | the first string of the IP address |
| Length | 3 bytes | variable | 1 byte | 3 bytes | variable | 1 byte | 3 bytes | variable | 3 bytes |

SECURE ACCESS TO A UNIFIED LOGON-ENABLED DATA STORE

BACKGROUND OF THE INVENTION

1. Field of the Invention

This invention relates in general to computer implemented database management systems, and more particularly, to a technique for secure access to a unified logon-enabled database server.

2. Description of Related Art

A data store is a term used to refer to a generic data storage facility, such as a relational database, flat-file, hierarchical database, etc. For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Databases are computerized information storage and retrieval systems. For example, a Relational Database Management System (RDBMS) is a database management system (DBMS) which uses relational techniques for storing and retrieving data. Relational databases are organized into physical tables which consist of rows and columns of data. The rows are formally called tuples. A database will typically have many physical tables and each physical table will typically have multiple tuples and multiple columns. The physical tables are typically stored on random access storage devices (RASED) such as magnetic or optical disk drives for semi-permanent storage. Additionally, logical tables or "views" can be generated based on the physical tables and provide a particular way of looking at the database. A view arranges rows in some order, without affecting the physical organization of the database.

In some systems, a client computer is networked to a server computer, for example via a computer network. The client computer may use a user management function provided by its operating system (e.g., Windows NT®) to control its logon process. For example, the Windows NT® operating system requires a user to enter a user name and a password to use the client computer. In a unified logon environment, each client computer connecting to a database server computer needs to have a corresponding user identifier (ID) and password created on the server computer.

This unified logon requirement creates an administrator's nightmare because the administrator needs to maintain all of the client user name/password and server user ID/password combinations for each user and for each client and server computer. In some systems, there could be more than a thousand client computers connecting to the same server computer, requiring the maintenance of thousands of user name/password or user ID/password combinations. Maintaining user names, user identifiers and passwords may be even more complicated in a federated system in which many client computers are connected to many server computers that are connected together. Furthermore, to maintain a high level of security, many companies are now resorting to changing passwords every three to six months, which adds to the administrative burden, as well as being a burden on users.

In particular, a system administrator may manually change the passwords at the server computer, and then the system administrator notifies the users of their new passwords. There is a security risk in that the new password from the administrator to users could be intercepted by hackers. The same situation applies to users, when they manually change their passwords themselves and then inform their administrator of the new passwords.

Thus, there is a need in the art for an improved technique for secure access to a unified logon-enabled database server.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented technique for secure access to a unified logon-enabled database server.

In accordance with the present invention, security is provided for a computer connected to a data store. Initially, an authentication key, a user name, and a computer identifier are received. The authentication key is parsed to obtain a parsed user name and computer identifier. The parsed user name and computer identifier are validated using the received user name and computer identifier.

Additionally, in accordance with yet another embodiment, if the received user name and computer identifier are validated, the authentication key is parsed to obtain a server user identifier and a server password. Then, the parsed server user identifier and server password are used to connect to a database server computer.

BRIEF DESCRIPTION OF THE DRAWINGS

Referring now to the drawings in which like reference numbers represent corresponding parts throughout:

FIG. 2 illustrates a table that summarizes the structure for an authentication key before encryption;

DETAILED DESCRIPTION

In the following description of an embodiment of the invention, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
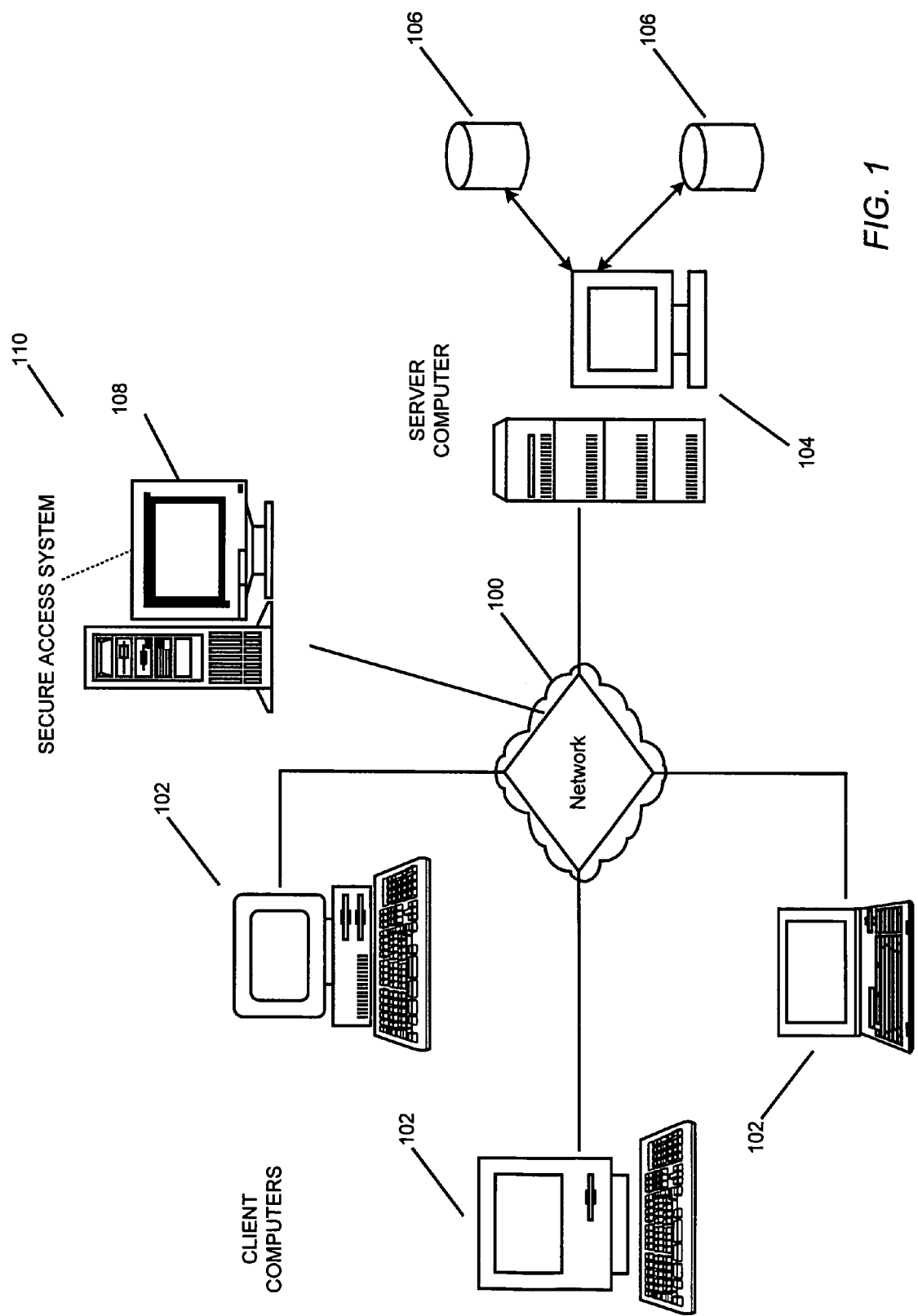
FIG. 1 is a schematic diagram illustrating a hardware environment of an embodiment of the present invention, and more particularly, illustrates a typical distributed computer system.

FIG. 1 schematically illustrates the hardware environment of an embodiment of the present invention, and more particularly, illustrates a typical distributed computer system using the network 100 to connect client computers 102 executing client applications to a server computer 104 executing software and other computer programs, and to connect the server system 104 to data sources 106. In one embodiment, the client computers 102 are Windows NT® workstations, and the server computer 104 is a Universal Database (UDB) server computer. It is to be understood that the Windows NT® workstations and Universal Database Server are being used for illustration only, and the invention may be practiced with other databases or computers.

A Secure Access System 110 may reside on another computer 108 that is connected to the network 100. Although the Secure Access System 110 is shown at a computer 108 separate from the client computers 102 and the server computer 104, it can be envisioned that the Secure Access System 110 may reside on a client computer 102, the server computer 104, or some combination of computers.

A typical combination of resources may include client computers 102 that are personal computers or workstations, and a server computer 104 that is a personal computer, workstation, minicomputer, or mainframe. These systems are coupled to one another by various networks, including LANs, WANs, and the Internet. The data sources 106 may be geographically distributed.

A client computer 102 typically executes a client application and is coupled to a server computer 104 executing server software. The client application program is typically a software program which can include, inter alia, multimedia based applications, e-mail applications, e-business applications, or workflow applications. The server software is typically a program such as DB2 Universal Database (UDB)® from International Business Machines, Corporation. The server computer 104 also uses a data source interface and, possibly, other computer programs, for connecting to the data sources 106. The client computer 102 is bi-directionally coupled with the server computer 104 over a line or via a wireless system. In turn, the server computer 104 is bi-directionally coupled with data sources 106. The computer 110 is bidirectionally coupled with the client computers 102 and the server computers 104. In one embodiment, the Secure Access System 110 intercepts data from the client computer to the server computer and performs security processing, as will be discussed below.

The computer programs executing at each of the computers, including the Secure Access System 110, are comprised of instructions which, when read and executed by the computers, cause the computers to perform the steps necessary to implement and/or use the present invention. Generally, computer programs are tangibly embodied in and/or readable from a device, carrier, or media, such as memory, data storage devices, and/or data communications devices Under control of an operating system, the computer programs may be loaded from the memory, data storage devices, and/or data communications devices into the memory of each computer for use during actual operations.

Thus, the present invention may be implemented as a method, apparatus, system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media, including the internet. Of course, those skilled in the art will recognize many modifications may be made to this configuration without departing from the scope of the present invention.

Those skilled in the art will recognize that the environment illustrated in FIG. 1 is not intended to limit the present invention. Indeed, those skilled in the art will recognize that other alternative hardware environments may be used without departing from the scope of the present invention.

Secure Access System

Due to the rapid growth in the use of client/server systems, security issues for these systems have become increasingly important. The Secure Access System 110 will address two problems associated with a unified logon-enabled database server computer, namely, password maintenance and password security.

The Secure Access System 110 reduces the number of server user ID/password combinations needed by a unified logon-enabled database server computer in a secure environment. With the Secure Access System 110, the system administrator only needs to create a few server user IDs on a server computer and assign access privileges to these user IDs individually. These server user IDs will be used by a number of users in an operating system with the unified logon capability. For example, a server user ID may be assigned to five client workstation users, allowing each of them to connect to a server computer with the same user ID.

The Secure Access System 110 consists of four elements and processes: (1) the structure of an authentication key, (2) the procedure to generate an authentication key, (3) the delivery of the authentication key, and (4) the procedure to parse an authentication key. Based on the structure defined in the part (1), a generator program of the Secure Access System 110 processes part (2) and part (3). A parser program of the Secure Access System 110 handles part (4).

Structure of an Authentication Key

An authentication key is comprised of four pieces of information:
- server (e.g., UDB) user ID,
- server (e.g., UDB) password,
- client (e.g., Windows NT®) user name, and
- client (e.g., Windows NT® computer) IP address.

The server user ID and password are used to log onto the server computer. The client user name is the user name at the client workstation. The client IP address refers to an identifier of a computer (i.e., a computer identifier) in a TCP/IP network. When a user initially is assigned to a client workstation, the user provides the system administrator with a client user name and an IP address of the client workstation. A server user ID and a server password are assigned to the user by a system administrator. Additionally, the user provides an E-mail address to the system administrator.

In terms of addressing the concern of password security, even though a group of client users use the same server user ID/password to connect to a server computer, the authentication keys they use are unique. In fact, even two users from the same client workstation will have different keys. Moreover, a stolen authentication key is useless, since it can only be used from a specific client workstation with a specific client user name (which is obtained when a user logs onto a client workstation with a client user name and password).

As stated above, an authentication key is constructed from four pieces of information: a server user ID, a server password, a client user name, and an IP address of a client workstation. The structure of an authentication key is described below:

1. All the characters in the authentication key are readable/printable.
2. IP address is represented in dotted decimal notation, which has 4 strings separated by '.'(e.g., 128.10.2.30). Each string will be extracted and padded with leading zero's to make it a 3-digit string. For example, 128.10.2.30 is converted to 128.010.002.030.
3. An authentication key has nine fields:
   a. The first field stores the fourth string of the IP address, and its length is 3-byte.
   b. The second field holds the server user ID, and its length is variable.
   c. The third field has 1-byte length for a separator ','.
   d. The fourth field stores the third string of the IP address, and its length is 3-byte.
   e. The fifth field stores the server password, and its length is variable.
   f. The sixth field has 1-byte length for a separator ','.
   g. The seventh field contains the second string of the IP address, and its length is 3-byte.
   h. The eighth field holds the client user name, and its length is variable.
   i. The ninth field contains the first string of the IP address, and its length is 3-byte FIG. 2 illustrates a table 200 that summarizes the structure for an authentication key before encryption (i.e., in an unencrypted format). In particular, the table 200 illustrates the field and length for each of the nine fields of an authentication key.

For example, if the server user ID is ADMINUSER, the server password is HIGHPRIV, client user name is Michael, and the client IP address is 9.112.19.75, the authentication key in an unencrypted format is as follows:

075ADMINUSER,019HIGHPRIV,112Michael009

Generating an Authentication Key

This authentication key is generated by the generator program of the Secure Access System 110 as an encrypted, printable string, which is further described in U.S. patent application Ser. No. 09/397,439, filed on Sep. 17, 1999, entitled A TECHNIQUE OF PASSWORD ENCRYPTION AND DECRYPTION FOR USER AUTHENTICATION IN A FEDERATED CONTENT MANAGEMENT SYSTEM, by Michael C. Hsing, et al., which is incorporated by reference herein. Based on the encryption technique of U.S. patent application Ser. No. 09/397,439, every eight characters will be encrypted into a 12-byte string. The remaining characters with a length less than eight will also be encrypted into a 12-byte string.

Continuing with the example, the authentication key (38 bytes in length) for Michael before encryption is arranged into rows of eight characters (for viewing convenience):
075ADMIN
USER, 019
HIGHPRIV
,112Mich
ael009

This is a combination of the IP address (9.112.19.75) for a client workstation, a server user ID, a server password, and a client user name. The encrypted string of this authentication key (60 bytes in length) is shown below as rows of twelve characters (for viewing convenience):
8,S"e]=-rDDF
n"Y66'tP@
uqVd#% Xad@D@
_v=""8\"fr@
Hk|v'*"('DBR Delivery of the Authentication Key The Secure Access System 110 maintains a notification list of users, where each entry in the list includes a client user name, a client workstation name, and an E-mail address. Once the authentication keys are generated and encrypted, the Secure Access System 110 forwards the authentication keys to the E-mail addresses identified in the notification list.

The system administrator may maintain a notification list as follows:

| Client User Name | Client Workstation Name | E-mail address |
| --- | --- | --- |
| Michael | chsing | mhsing@us.ibm.com |
| ... | | |

Then, the encrypted authentication key below is sent to the E-mail address: mhsing@us.ibm.com.

8,S"e]=-rDDF###n"Y66'tP@uqVd#%Xad@D@_v=""8\'fr@Hk|v'*"('DBR

Parsing an Authentication Key

When a user logs onto a client workstation, the client workstation stores the user name. Then, the client workstation connects to the server computer. In particular, when connecting to a server computer from a client workstation, the client workstation transmits the authentication key to the server computer. Additionally, when the authentication key is transmitted, the client workstation also transmits the actual IP address and client user name.

The parser program of the Secure Access System 110 intercepts the authentication key after it has been sent by the client workstation and before it is received by the server computer. The parser program of the Secure Access system 110 will process the authentication key and decrypt the authentication key into an IP address, a client user name, a server user ID, and a server password. If the decrypted IP address and client user name match the actual IP address and client user name, the parser program of the Secure Access System 110 uses the decrypted server user ID and server password to connect to the server computer. Otherwise, the Secure Access System 110 returns an error. Moreover, if an authentication key cannot be found, the default client workstation logon user ID and password will be used.

This technique addresses the concerns of password maintenance. When a password expires on a server computer, the system administrator will simply use the Secure Access System 110 to send out new authentication keys to each user. The administrative burden is definitely relieved.

Unified logon is an important requirement for today's enterprise computing. However, it imposes additional administrative burdens on a system administrator and introduces potential security problems. The Secure Access System 110 provides a secure approach to accessing a unified logon-enabled database server computer. The Secure Access System 110 reduces the administrative burden of maintaining passwords and enhances the security of passwords. The Secure Access System 110 provides significant benefits to client/server systems, in which a server computer is used for storing administrative information for accessing, for example, a federated data store that is linked to various back-end server computers, such as IBM's Digital Library, VisualInfo 400, ImagePlus 390, Domino.Doc, etc.

One unique aspect of the invention is the concept of an authentication key. Without a correct authentication key, a user ID/password is totally useless. This provides additional security for the database server computer.

Scenarios for Using Authentication Key

The system administrator may maintain a notification list like this:

| Client User Name | Client Workstation Name | E-Mail address |
|---|---|---|
| Michael | chsing | mhsing@us.ibm.com |
| Alan | ayaung | ayaung@us.ibm.com |
| . . . | . . . | . . . |

The administrator creates a user: ADMINUSER with password:HIGHPRIV on the server computer and grants it the proper access privileges. If the administrator wants to let all the users (e.g., Michael, Alan, etc.) in the list access the server computer as ADMINUSER/HIGHPRIV, the system administrator will run a generator program to generate and send an unique authentication key to each user on the list.

The authentication key for Michael before encryption is as follows:

075ADMINUSER, 019HIGHPRIV, 112Michael009

The encrypted string of this authentication key, which can be sent to the user through E-mail, is as follows:

8,S"e]=-rDDF###n"Y66'tP@uqVd#%Xad@D@_v= ""8\'fr@Hk|v'*"('DBR

By the same token, the authentication key for user Alan (IP address 9.112.21.225) before encryption is as follows:

225ADMINUSER,021HIGHPRIV,112Alan009

After encryption, the authentication key is as follows:

+5y-hTJATB@'0|6s-LV6P'D'uqVd#%   Xad@D@;i (IO9&QP@Bd" m)&r%('FTB

Thus, although both Michael and Alan will connect to the same server computer with the same server user name and password (i.e., ADMINUSER/HIGHPRIV), each has his unique authentication key, which is not shareable between users or computers.

The parser program of the Secure Access System 110 will process the authentication key, decrypt it into IP address, client user name, server user ID, and server password. If the decrypted IP address and client user name match the actual client workstation and its current user, the parser program of the Secure Access system 110 uses the decrypted server user ID and server password to connect to the server computer. Otherwise, the Secure Access System 110 returns an error. If an authentication key cannot be found, the default client workstation logon user ID and password will be used.

Flow Diagrams

Figure 3:
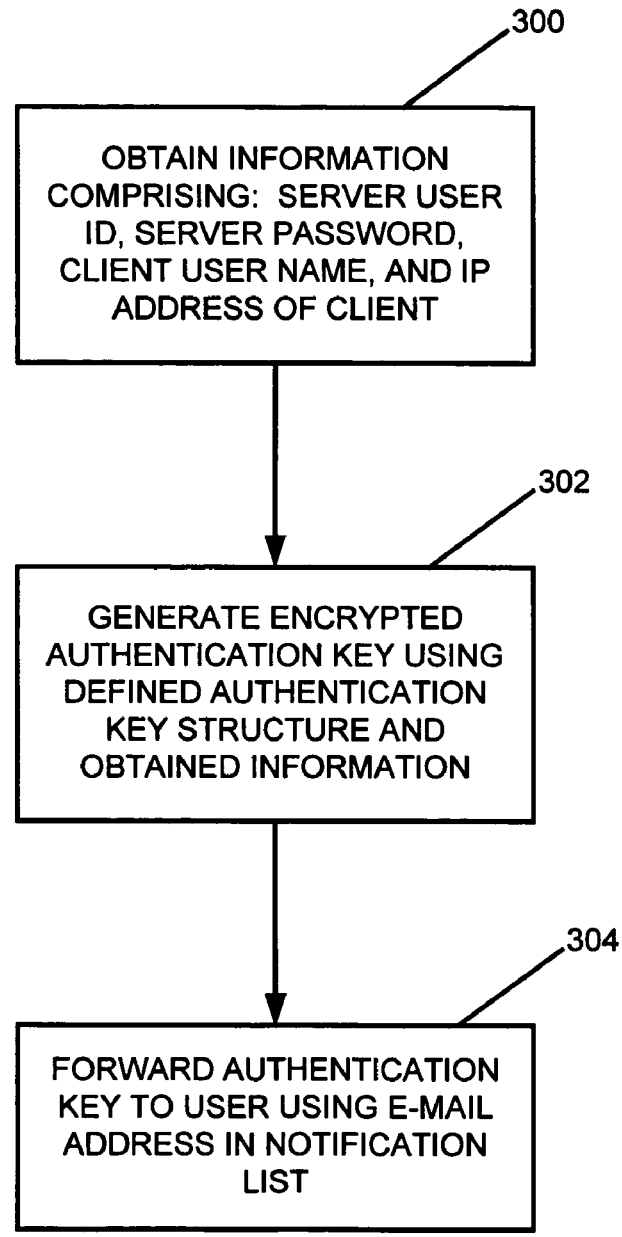
FIG. 3 is a flow diagram illustrating the steps performed by the Secure Access System to generate and forward an authentication key.

FIG. 3 is a flow diagram illustrating the steps performed by the Secure Access System 110 to generate and forward an authentication key. In block 300, the Secure Access System 110 obtains information comprising a server ID, a server password, a client user name, and an IP address of the client computer. In block 302, the Secure Access System 110 generates an encrypted authentication key using a defined authentication key structure and the obtained information. In block 304, the Secure Access System 110 forwards the authentication key to the user using an E-mail. The E-mail address is stored in a notification list.

Figure 4:
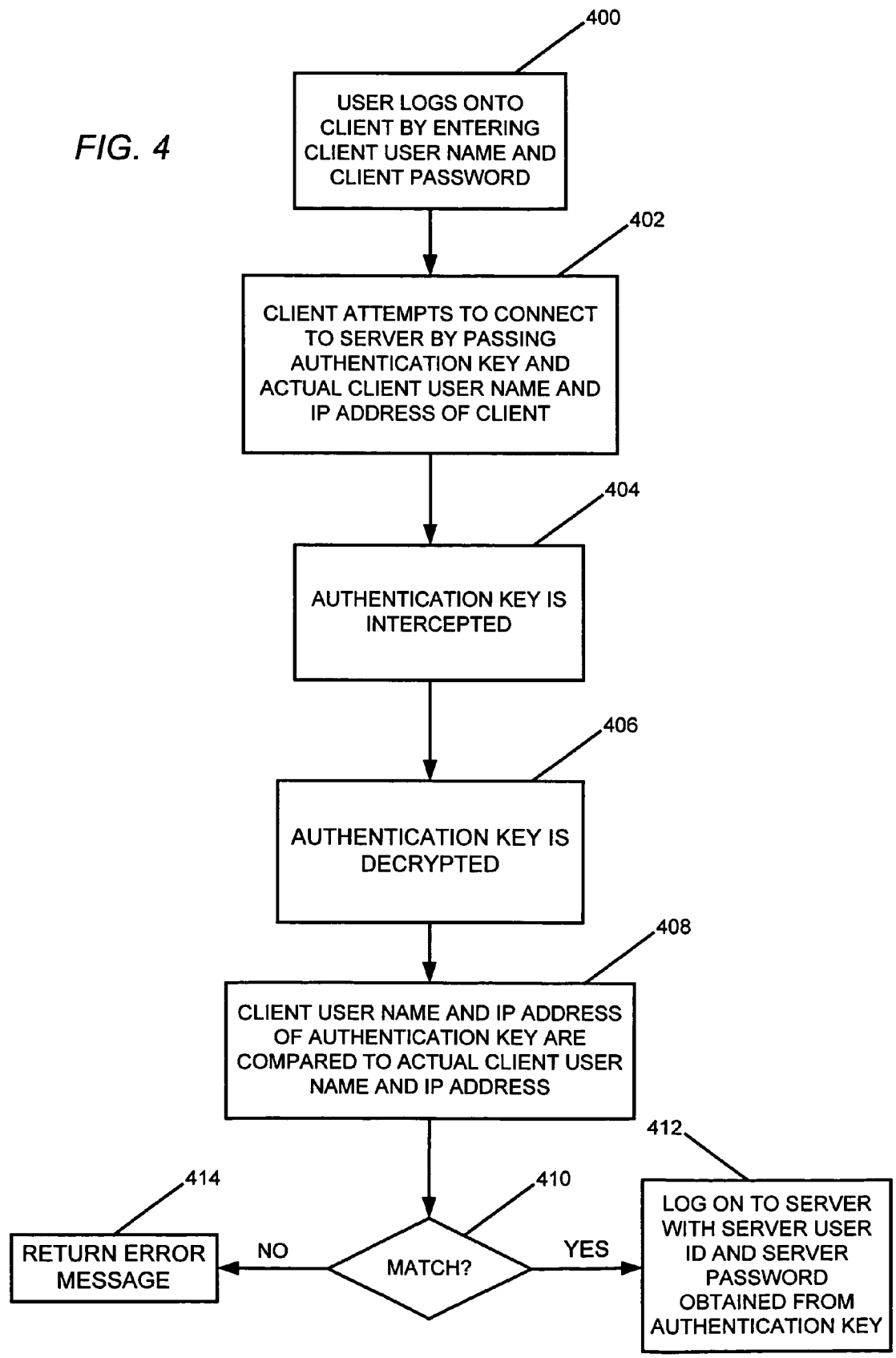
FIG. 4 is a flow diagram illustrating the process of using an authentication key.

FIG. 4 is a flow diagram illustrating the process of using an authentication key. In block 400, a user logs onto a client computer by entering a client user name and password. In block 402, the client computer attempts to connect to a server computer by passing the authentication key and an actual client user name and IP address of the client computer to the server computer. In block 404, the authentication key is intercepted. In block 406, the authentication key is decrypted. In block 408, the client user name and IP address obtained from the decrypted authentication key are compared to the actual client user name and IP address. In block 410, if there is a match, processing continues to block 412, otherwise, processing continues to block 414. In block 412, log on to the server computer is accomplished using the server user ID and server password obtained from the decrypted authentication key. In block 414, an error message is returned.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of providing security for a computer connected to a data store via a server, the method comprising;
    generating an authentication key based on a user name, and a computer identifier, and a server user identifier;
    receiving the authentication key, the user name, and the computer identifier;
    parsing the authentication key to obtain a parsed user name, computer identifier, and server user identifier; and
    validating the received user name and computer identifier using the parsed user name and computer identifier; and
    when the received user name and the computer identifier match the parsed user name and the computer identifier, using the parsed server user identifier to access the server,
    wherein the user accesses the data store via the server using the generated authentication key, and wherein, when the server user identifier changes, a new authentication key is generated for the user and the user accesses the data store via the server using the new authentication key.

2. The method of claim 1, wherein validating comprises determining whether the received user name and computer identifier match the parsed user name and computer identifier.

3. The method of claim 2, wherein a match indicates that the received user name and computer identifier are valid.

4. The method of claim 1, further comprising, before parsing, decrypting the authentication key.

5. The method of claim 1, further comprising, if the received user name and computer identifier are valid, logging onto the server with the server user identifier and a server password.

6. The method of claim 5, further comprising, parsing the authentication key to obtain the sever user identifier and server password.

7. The method of claim 6, wherein multiple users share one server user identifier and server password.

8. The method of claim 1, wherein the computer is connected to a client and the server and wherein the authentication key is generated with a client user name, a client computer identifier, the server user identifier, and a server password.

9. The method of claim 8, further comprising encrypting the authentication key.

10. The method of claim 8, further comprising forwarding the authentication key to a user.

11. The method of claim 1, wherein the computer is connected to a client and the server, and further comprising;
at the client, transmitting the authentication key, a client user name, and a client computer identifier to the server; and
at the computer,
    intercepting the authentication key; and
    if the user name and computer identifier are valid, logging onto the server.

12. An apparatus for providing security, comprising:
a computer having a server connected thereto to access a data store;
one or more Computer programs, performed by the computer, for generating an authentication key based on a user name and a computer identifier, said authentication key includes a server user name, receiving the authentication key, the user name, and the computer identifier, parsing the authentication key to obtain a parsed user name, computer identifier, and server user name, and validating the received user name and computer identifier using the parsed user name and computer identifier,
wherein the user uses the parsed server user name to access the data store via the server, and
wherein, when the server user name changes, a new authentication key is generated for the user and the user accesses the data store via the server using the changed server user name obtained from parsing the new authentication key.

13. The apparatus of claim 12, wherein validating comprises determining whether the received user name and computer identifier match the parsed user name and computer identifier.

14. The apparatus of claim 13, wherein a match indicates that the received user name and computer identifier are valid.

15. The apparatus of claim 12, further comprising, before parsing, decrypting the authentication key.

16. The apparatus of claim 12, further comprising, if the received user name and computer identifier are valid, logging onto the server with the server user identifier and server password.

17. The apparatus of claim 16, further comprising, parsing the authentication key to obtain the server user identifier and server password.

18. The apparatus of claim 17, wherein multiple users share one server user identifier and server password.

19. The apparatus of claim 12, wherein the computer is connected to a client and the server and wherein the authentication key is generated with a client user name, a client computer identifier, the server user identifier, and a server password.

20. The apparatus of claim 19, further comprising encrypting the authentication key.

21. The apparatus of claim 19, further comprising forwarding the authentication key to a user.

22. The apparatus of claim 12, wherein the computer is connected to a client and the server, and further comprising:
at the client, transmitting the authentication key, a client user name, and a client computer identifier to the server; and
at the computer,
    intercepting the authentication key; and
    if the user name and computer identifier are valid, logging onto the server.

23. An article of manufacture comprising a computer program carrier readable by a computer connected to a server and embodying one or more instructions executable by the computer to perform method steps for providing security to the server connected to a data store, the method comprising:
generating an authentication key that includes a server user identifier, based on a user name and a computer identifier;
receiving the authentication key, the user name, and the computer identifier;
parsing the authentication key to obtain a parsed user name, computer identifier, and server user name; and
validating the received user name and computer identifier using the parses user name and computer identifier,
wherein the user uses the parsed server user name to access the data store via the server, and
wherein, when the server name changes, a new authentication key is generated for the user and the user accesses the data store via the server using the changed server user name obtained from parsing the new authentication key.

24. The article of manufacture of claim 23, wherein validating comprises determining whether the received user name and computer identifier match the parsed user name and computer identifier.

25. The article of manufacture of claim 24, wherein a match indicates that the received user name and computer identifier are valid.

26. The article of manufacture of claim 23, further comprising, before parsing, decrypting the authentication key.

27. The article of manufacture of claim 23, further comprising, if the received user name and computer identifier are valid, logging onto the server connected to the computer with the server user identifier and server password.

28. The article of manufacture of claim 27, further comprising, parsing the authentication key to obtain the server user and server password.

29. The article of manufacture of claim 28, wherein multiple users shared one server user identifier and server password.

30. The article manufacture of claim 23, wherein the computer is connected to a client and the server and wherein the authentication key is generated with a client user name, a client computer identifier, the server user identifier, and a server password.

31. The article of manufacture of claim 30, further comprising encrypting the authentication key.

32. The article of manufacture of claim 30, further comprising forwarding the authentication key to a user.

33. The article of manufacture of claim 23, wherein the computer is connected to a client and the server, and further comprising:

at the client, transmitting the authentication key, a client user name, and a client computer at the computer, intercepting the authentication key; and if the user name and computer identifier are valid, logging onto the server.

34. The method of claim 8, wherein the generated authentication key for access to the server is sent to a user, and further comprises a server password, and wherein when the server password changes, a unique new authentication key based on the server user identifier and the server password is sent to the user.

35. The method of claim 34, wherein when the client transmits the generated authentication key, the user name and the computer identifier, to the server, the authentication key is intercepted and validated by the computer.

36. The method of claim 35, wherein when the computer determines that the received user name and the computer identifier match the parsed user name and the computer identifier, the computer parses the authentication key to obtain the server user identifier and the server password.

37. The method of claim 36, wherein the parsed server use identifier and the parsed server password is transmitted to the serve, connecting the client computer to the server.

38. The method of claim 8, wherein the authentication key comprises the computer identifier split into portions and the portions being interposed between the user name, the server user identifier and the server password prior to encryption.

39. The method according to claim 8, wherein the computer identifier is an IP address.

40. A method of facilitating security maintance in a secure access to a data store via a server, the method comprising:

each time the user logs onto a client workstation with a computer identifier, generation an authentication key based on a server identifier, a server password, a user name, and the computer identifier;

receiving the authentication key, the user name, and the computer identifier;

parsing the authentication key to obtain a parsed user name, computer identifier server identifier, and server password; and validating the received user name and computer identifier using the parsed user name and computer identifier; and accessing the data store via the server using the parsed server identifier and the parsed server password, wherein when the administrator changes the server password a new authentication key is generated and transmitted to the user for access to the data store.

41. The method of claim 1, wherein the authentication key comprises a plurality of fields, and wherein a first field type stores a portion of the computer identifier, a second field type stores at least one the server user identifier, a server password, the user name, and a third field type comprises a separator.

42. The method of claim 1, wherein the user accesses the data store via the server using a unique authentication key generated using the user name, the computer identifier, the server user identifier, and a server password that corresponds to the server user identifier, and wherein, when the administrator changes the server password, a new authentication key is generated for the user and the user accesses the data store via the server using the new authentication key.

43. The method of claim 1, wherein a plurality of authentication keys for different users are generated using the server user identifier, and wherein, when the server user identifier changes, a plurality of new authentication keys are generated for the different users and each of the generated plurality of new authentication keys is transmitted to respective user.

* * * * *